United States Patent [19]
Ito et al.

[11] Patent Number: 5,852,340
[45] Date of Patent: Dec. 22, 1998

[54] LOW-VOLTAGE TYPE IGNITER PLUG HAVING A SEMICONDUCTOR FOR USE IN JET AND OTHER INTERNAL COMBUSTION ENGINES AND A METHOD OF MAKING THE SEMICONDUCTOR

[75] Inventors: Yukihiko Ito; Eigo Goto, both of Nagoya, Japan

[73] Assignee: NGK Spark Plug Co., Ltd., Nagoya, Japan

[21] Appl. No.: 665,874

[22] Filed: Jun. 19, 1996

[30] Foreign Application Priority Data

Jun. 19, 1995 [JP] Japan ................................ 7-151341
Jun. 12, 1996 [JP] Japan ................................ 8-151425

[51] Int. Cl.⁶ ............................ H01T 13/20; H01T 13/39
[52] U.S. Cl. ...................... 313/141; 313/1.41; 313/130; 313/131 A; 313/131 R
[58] Field of Search .................................... 313/141, 130, 313/131 R, 131 A, 140

[56] References Cited

U.S. PATENT DOCUMENTS

| | | | |
|---|---|---|---|
| 3,558,959 | 1/1971 | Ziemendorf | 313/130 |
| 4,829,027 | 5/1989 | Cutler et al. | 501/89 |
| 4,973,877 | 11/1990 | Suzuki et al. | 313/131 |
| 5,102,592 | 4/1992 | McCauley et al. | 264/56 |

FOREIGN PATENT DOCUMENTS

| | | | |
|---|---|---|---|
| 3008536 | 12/1994 | Japan | H01T 13/20 |
| 758509 | 10/1956 | United Kingdom . | |
| 983567 | 2/1965 | United Kingdom . | |
| 1071185 | 6/1967 | United Kingdom | C04B 35/64 |
| A2142343 | 1/1985 | United Kingdom | C22C 29/00 |
| A2177421 | 1/1987 | United Kingdom | B22F 3/00 |

*Primary Examiner*—Sandra L. O'Shea
*Assistant Examiner*—Joseph Williams
*Attorney, Agent, or Firm*—Sughrue, Mion, Zinn, Macpeak & Seas, PLLC

[57] ABSTRACT

An igniter plug is disclosed for use in jet and other internal combustion engines. The igniter plug has a center electrode having a firing tip, which is mounted within an insulator which in turn is mounted within an exterior metal shell. A ground electrode is integral with or in electrical contact relationship with the metal shell and is disposed in a spaced, spark gap relation with the firing tip of the center electrode. An electrically semiconducting surface is disposed adjacent the spark gap and in electrical contact with the center electrode and with the ground electrode. The electrically semiconducting surface is formed by a sintered ceramic body having an actual density of more than 95 percent of its theoretical maximum density, and consists essentially of 67–80 wt % of silicon carbide particles and 20–33 percent by weight of grain boundary phase of alumina particles, as well as one or more sintering aids selected from magnesia, silica or calcia. Not only is the density of the sintered ceramic body high, it is uniform. This uniform density provides for uniform electrical characteristics and increased resistance to erosion due to electrical discharges between the electrodes. The high and uniform density of the sintered ceramic body is obtained by applying pressure to the ceramic body only after reaching the sintering temperature.

9 Claims, 7 Drawing Sheets

LOW-VOLTAGE TYPE IGNITER PLUG HAVING A SEMICONDUCTOR FOR USE IN JET AND OTHER INTERNAL COMBUSTION ENGINES AND A METHOD OF MAKING THE SEMICONDUCTOR

BACKGROUND OF THE INVENTION

1. Field of the Invention

This invention relates to an igniter having a semiconductor and a method of making the semiconductor which is used in the igniter for a jet engine, a gas turbine and the like.

2. Description of the Prior Art

A method of making a low voltage type igniter plug is disclosed in U.S. Pat. Nos. 3,558,959 and 4,973,877. According to the former patent publication, a sintered semiconducting body is produced by a hot press procedure with silicon carbide and alumina as main constituents so as to ameliorate a spark erosion resistance against high energy spark discharges in high temperature and wet air-fuel mixture environment.

According to the latter patent publication, micro particles of silicon carbide and alumina are mixed with an addition of sintering aids so as to provide a predetermined compact body. Then, the compact body is sintered above the temperature of 1800° C. under the pressure of 200 kg/cm$^2$ or more by means of hot press procedure so as to produce a tough-structured semiconductor.

In the method disclosed by U.S. Pat. No. 3,558,959, the pressure of 600 p/in$^2$ (approx. 42 kg/cm$^2$) is applied when the heating temperature reaches 2700° F. (approx. 1480° C.), and the pressure is built up with the increase of the temperature so that the pressure is increased to 6000 p/in$^2$ (approx. 420 kg/cm$^2$) when reaching the sintering temperature. After maintaining the sintering temperature for a predetermined time period, the ceramic body is gradually cooled until the temperature decreases to 2700° F. while keeping the pressure of 6000 p/in$^2$.

However, in the semiconductor thus produced, it is difficult to obtain its relative density exceeding 95 percent when the silicon carbide is more than 65 percent by weight. For this reason, an amount of the spark erosion increases compared to the counterpart containing a low silicon carbide. Moreover, it requires the sintering temperature of more than 3440° F. (approx. 1893° C.), and this makes the sintered body readily stick to a mold die which preforms the unfired ceramic body.

In the method disclosed by U.S. Pat. No. 4,973,877, the unsintered ceramic semiconducting body is pressurized under 250 kg/cm$^2$ as shown by the pressure changing line B2 in FIG. 8 when the heating temperature reaches 1200° C. as shown by the temperature changing line A2. Thereafter, the ceramic body is kept pressurized while raising to the sintering temperature which is maintained for a predetermined time period. The sintered body, thus prepared, is gradually cooled, and released from an exposure of the pressure when lowered to 1200° C. In this instance, it is to be observed that the ambient pressure is shown by the broken lines Ar2 in FIG. 8.

However, it is found that the semiconductor produced in this way has a microstructure of an unequal density distribution, when it contains more than 65% by weight of the silicon carbide. An outerside texture of the semiconductor looks crowded or rather dense as shown in FIG. 9, while an innerside texture of the semiconductor looks coarse as shown in FIG. 10. This is because the former is coagulated with grain boundary, but the latter is not coagulated with the granular boundary.

As shown by the broken lines E2 in FIG. 5, an electrical resistance increases as approaching deeper innerside the semiconductor in the case of U.S. Pat. No. 4,973,877. Upon carrying out this experimental test, the electrical resistance of the semiconductor was measured each time when its rear end surface is sliced by 0.3 mm along its lengthwise direction. The measurement was done by using a 2000 V. megaohm meter with a probe gap taken as 1.23 mm, as shown in FIG. 4.

For the reason that the prior art semiconductor of a high silicon carbide content is crowded at the outside, and coarse at the inside, the crowded portion is removed by grinding the outside of the semiconductor. Even if the outside i.e., the surface is removed, the prior art semiconductor shows a decrease in an electrical resistance as approaching the inside i.e, the bulk, of the semiconductor, while increasing the depth from the surface as approaching the inside of the semiconductor. When the prior art semiconductor is used in an igniter plug, because the semiconductor is subjected to a heavy and extensive erosion by a single turn of spark, the semiconductor is spark eroded by a lump. It is for this reason that the semiconductor for the low voltage type ignition has been desired to be strong and durable on a spark erosion resistant property.

Therefore, it is one of the objects of the invention to provide a low voltage type igniter plug having a semiconductor of a high silicon carbide content and a high density with a high erosion resistance and to provide a method of making the semiconductor which is superior in a spark erosion resistance with the least erosion per a single turn of spark.

SUMMARY OF THE INVENTION

According to the present invention, there is provided an igniter plug for jet and other internal combustion engines, which igniter plug comprises a center electrode having a firing tip, and mounted within an insulator which in turn is mounted within an exterior metal shell, a ground electrode integral or in electrical contact relationship with the metal shell and in spaced, spark-gap relation with the firing tip of the center electrode, and an electrically semiconducting surface adjacent the spark gap and in electrical contact with the center electrode and with the ground electrode, the improvement wherein said electrically semiconducting surface is a sintered ceramic body having a density of more than 95 percent in theory, and consisting essentially of 67–80 percent by weight of silicon carbide particles and 20–33 percent by weight of a sintering aid or aids selected from the group consisting of alumina, magnesia, silica and calcia.

According to another aspect of the invention, the sintered semiconducting ceramic body has a substantially uniform density from its outer surface to its inward.

According to another aspect of the invention, silicon carbide particles of the sintered semiconducting ceramic body are each coagulated with grain boundary phase.

According to another aspect of the invention, the semiconducting ceramic body has an almost same value of an electrical resistance level from the depth of 0.3 mm toward the inner ceramic body.

According to another aspect of the invention, the ceramic body has a density of 3.30–3.34 g/cm$^3$ measured in terms of Archimedean method.

According to another aspect of the invention, the ceramic body is a tube or ring having a height of 4 mm to 10 mm.

According to the present invention, there is provided a method of making a semiconductor for an igniter plug by means of a hot press procedure, comprising steps of: mixing 67–80 percent by weight of silicon carbide particles and 19–29 percent by weight of alumina and 1–5 percent by weight of a sintering aid or aids selected from the group consisting of magnesia, silica and calcia, so as to provide a ceramic mixture; granulating the mixture to make its grains generally uniform so as to provide an unfired ceramic body; heating the unfired ceramic body at a sintering temperature of 1800°–1900° C. to thermally sinter it; and keeping to pressurizing the ceramic body under a pressure of 200 kg/cm$^2$ or more only after the precedent heating temperature reaches the sintering temperature at the time of heating the unfired ceramic body.

According to another aspect of the invention, the silicon carbide particles with a mean particle size of less than 0.5 μm and the alumina particles having a mean particle size of less than 0.2 μm are used as starting materials.

With the constituents of 67–80 percent by weight of silicon carbide particles, it is possible to significantly reduce an amount of spark erosion of the semiconductor by a single turn of spark discharge. By adding the sintering aid or aids selected among alumina, magnesia, silica and calcia, it is possible to decrease the electrical resistance of the semiconductor to lower the voltage required to establish the spark discharge. With the relative density of more than 95%, it prevents the semiconductor from spark decaying in a lump with the least and limited amount of erosion per a single spark.

With the sintered ceramic body having a substantially uniform density from an outer surface of the ceramic body to an inward part of the ceramic body, it is possible to prevent the semiconductor from being spark eroded in a lump at the time of establishing the spark dicharges, and further preventing the semiconductor from rapidly eroded with the advancement of the spark erosion. Owing to the uniform density from an outer surface of the ceramic body to an inward of the ceramic body, a method of producing the semiconductor is specified by the present invention.

With the granular particles of the sintered semiconducting ceramic body each coagulated with its grain boundary phase, it is possible to prevent the semiconductor from being spark eroded in a lump at the time of establishing the spark dicharges, and further preventing the semiconductor from rapidly eroded with the advancement of the spark erosion. Owing to the granular particles of the sintered ceramic body each coagulated through its granular boundary phase, a method of producing the semiconductor is specified by the present invention.

With the semiconducting ceramic body being an almost same value of an electrical resistance level from the depth of 0.3 mm toward the inner ceramic body, it is possible to prevent the semiconductor from being spark eroded in a lump at the time of establishing the spark dicharges, and further preventing the semiconductor from rapidly eroded with the advancement of the spark erosion.

With the ceramic body has a density of 3.30–3.34 g/cm$^3$, it prevents the semiconductor from spark decaying in a lump with the least and limited amount of erosion per a single spark.

With the ceramic body being a tube or ring shape having a height of 4 mm to 10 mm, the height of this degree does not obstruct assembly of the semiconductor to the igniter plug. When the height is short of 4 mm, it is difficult to normally locate the semiconductor inside the ground electrode so as to admit an eccentricity between the center electrode and the ground electrode. When the height exceeds 10 mm, the spark erosion occurs deep inside the igniter plug with the advancement of the spark erosion. This deteriorates a starting behavior of the engine.

With the method of making a semiconductor for an igniter plug according to the invention, the pressure is applied to the ceramic body after the heating temperature reaches the sintering temperature. Under the sintering temperature, the ceramic mixture is not yet fictile so that the pressure is transmitted to an inner core of the ceramic mixture. As a result, a substantially uniform density is achieved from an outer surface to an inner core of the sintered body. Similarly, about the electrical resistance value is substantially constant from the outer surface to the inner core of the sintered body.

The sintering temperature is predetermined to be 1800°–1900° C. because the ceramic mixture is not so fictile as to form a homogeneously structured semiconductor when the temperature is short of 1800° C. When the sintering temperature exceeds 2000° C., the sintered body is likely to stick to a carbon or graphite mold die which is used to encapsulate or preform the ceramic mixture. With this in mind, it is to be observed that the sintering temperature is preferably less than 1900° C.

It is noted that a height or rather thickness of the semiconductor is preferably defined in the range of 4–10 mm. When the thickness is short of 4 mm, the pressure is transmitted deeper to an innerside of the ceramic mixture even with the use of prior art method, and thus achieving a substantially uniform density from an outer surface to an inner core of the sintered body without using the present invention.

When the thickness exceeds 10 mm, the pressure is not satisfactorily transmitted to the innerside of the ceramic mixture even with the use of the present invention. This likely makes the density of an inner side of the semiconductor coarse, and which may not usable for the stable and strong semiconductor of the igniter.

With the use of the silicon carbide particles having a mean particle size of less than 0.5 μm, and the alumina particles having a mean particle size of less than 0.2 μm, the single spark erodes the surface of the semiconductor only by a small groove-like loss left behind, and it is possible to significantly reduce an amount of the spark erosion per a single spark discharge with a limited area of the spark erosion.

The present method concerns to generally making a high density-semiconducting ceramic body for the igniter and its density uniformity from the inside to the outside of the sintered body, because it is possible with such a uniformity of the density to be superior in spark erosion resistance through a depth dimension of the semiconductor.

Furthermore, because the grain particles of the mixture body is coagulated through their granular boundary, it is possible to make the texture of the semiconductor substantially uniform in terms of electrical resistance.

BRIEF DESCRIPTION OF THE DRAWINGS

These and other objects, aspect and embodiments of the invention will be described in more detail with reference to the following drawing figures, of which.

DETAILED DESCRIPTION OF PREFERRED EMBODIMENTS OF THE INVENTION

Figure 2:
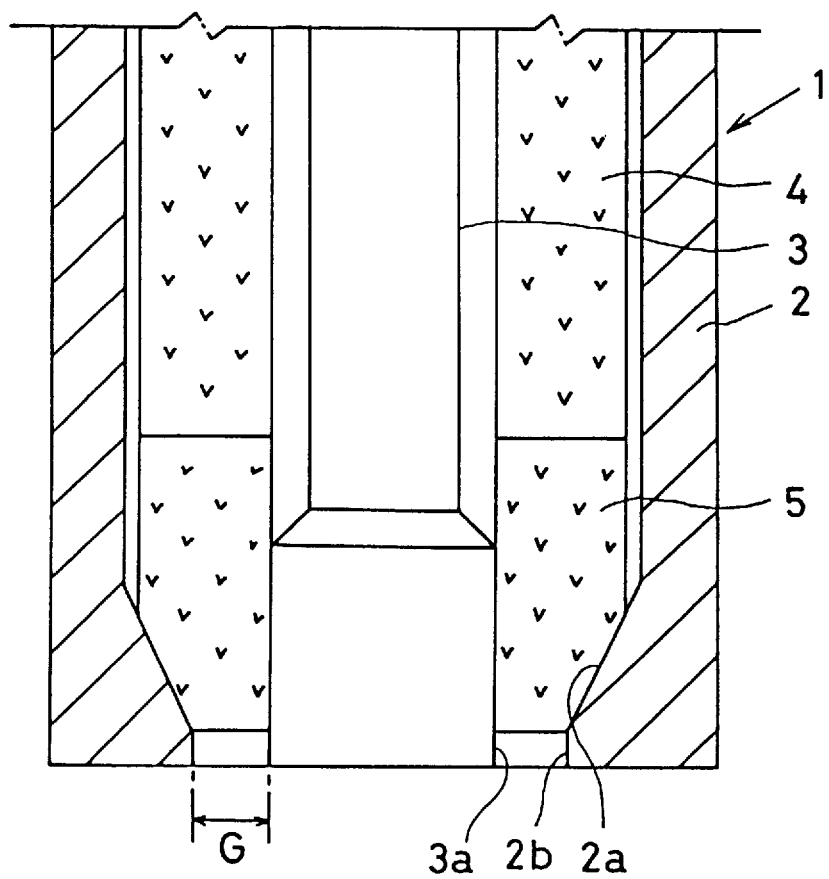
FIG. 2 is a cross sectional view of a front portion of a low-voltage type igniter plug.

Referring to FIG. 2 which shows an igniter plug having the semiconductor, a low-voltage type igniter plug 1 has a cylindrical metal shell 2 by which the igniter plug 1 is to be mounted on a jet engine, a gas turbine or the like (not shown). The igniter plug I has a tubular insulator 4 placed within the metal shell 2, and having a center electrode 3 located within the insulator 4. To the front end of the insulator 4, a cylindrical semiconductor 5 is connected in a manner to surround a front portion of the center electrode 3 as shown in FIG. 2.

The metal shell 2 is to be electrically grounded when mounting the igniter plug 1 on the engine. A front end portion of the metal shell 4 is gradually increased in its thickness with a tapered surface 2a. The tapered surface 2a terminates to form an annular wall 2b near the front distal end of the metallic shell 4. The annular wall 2b which forms a ground electrode measures e.g., 6–7 mm in inner diameter.

The center electrode 3 forms a bar-like configuration in a coaxial relationship with the metal shell 4, and is adapted to be energized by a voltage of approx. 2000 V. supplied from an ignition source device (not shown). The center electrode 3 has a front outer wall 3a in a concentrical relationship with the annular wall 2b. The front outer wall 3a measures approx., 4.0 mm in outer diameter. Between the annular wall 2b and the front outer wall 3a, an annular spark gap G is formed through which a spark discharge occurs when said voltage is applied across the center electrode 3 and the ground electrode integral with the shell 2.

The insulator 4 is made from ceramic material with alumina as a main constituent, and provided to electrically insulate the center electrode 3 from the metal shell 2.

As described hereinafter, the semiconductor 5 is a sintered solid body with silicon carbide (SiC) and alumina ($Al_2O_3$) as its main constituents. The cylindrical semiconductor 5 has a lower end corner bevelled to correspond to the tapered surface 2a of the metal shell 2. An inner wall of the semiconductor 5 corresponds to the front outer wall 3a of the center electrode 3.

Figure 1:
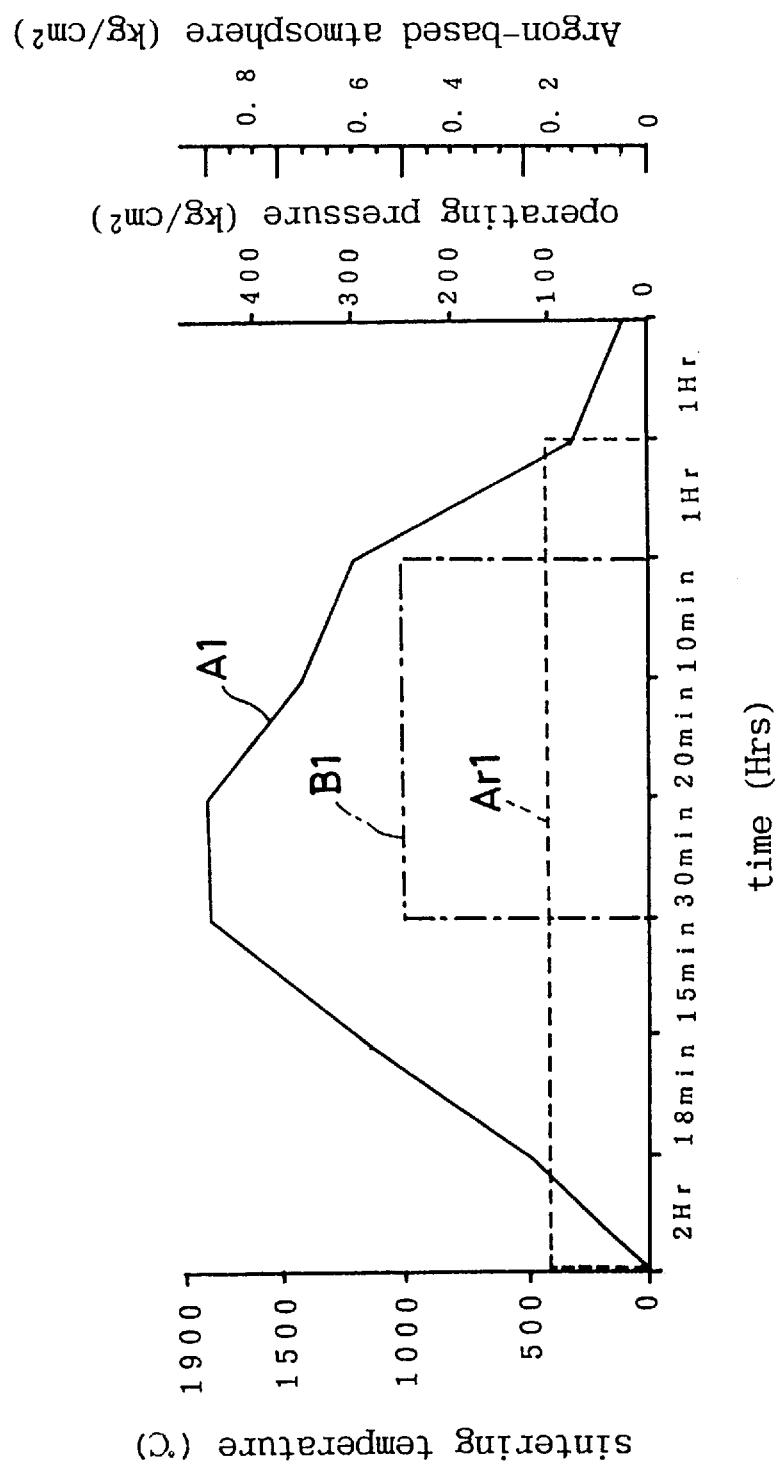
FIG. 1 is a graphical representation showing a relationship between a heating temperature and a pressure applied while sintering a semiconducting ceramic body according to an embodiment of the invention.

With reference to FIG. 1, a method of making the semiconductor 5 is described as follows:

(i) 67–80% by weight of silicon carbide particles, 19–29% by weight of alumina particles and 1–5% by weight of sintering aids which are magnesia, silica and calcia are added to form a mixture of silicon carbide particles and alumina particles as main constituents. In this instance, a mean grain size of silicon carbide particles is less than 5 $\mu$m, preferably less than 0.5 $\mu$m, while a means grain size of alumina particles is less than 1 $\mu$m, preferably less than 0.2 $\mu$m. In this situation, the sintering aid has 0.3% magnesia by weight, 0.5% calcium oxide by weight and 1.9% silica by weight. The mixture of silicon carbide particles, alumina particles and sintering aid are mixed in a ball mill for approx. 4 hours with an addition of distilled water and spray-dried to make a granulated mixture (mixing step).

It is to be noted that the grain size of the granulated mixture obtained by the mixing step may be arranged to be approx. 600 $\mu$m. The granulated mixture, thus arranged is easy to process and can be sintered without calcining the mixture body, because it contains only water as a temporary binder.

When the constituent of silicon carbide is short of 67% by weight, the electrical resistance value of the sintered semiconducting ceramic body increases to the extent that the low voltage of about 2000 V. does not always induce spark discharge across the electrodes, thus rendering it difficult to serve as an igniter plug of a safe use. When the constituent of silicon carbide exceeds 80% by weight, the electrical resistance value decreases to such a low level as to run a spark discharge along somewhat behind the front surface of the semiconductor when an air-fuel mixture covers an outer surface of a firing portion of the igniter plug. This permits a greater degree of spark erosion loss left on the semiconductor.

The mean grain size of silicon carbide should be less than 5 $\mu$m in order to reduce an amount of the spark erosion. By reducing the means grain size of silicon carbide to less than 0.5 $\mu$m, this tendency becomes remarkable in which the spark erosion leaves a groove-like loss behind the semiconductor with a limited and least spark erosion per a single spark discharge.

When the constituent of alumina is short of 19% by weight, the electrical resistance value decreases such a low level as to run a spark discharge along a front surface to somewhat behind the front surface of the semiconductor when an air-fuel mixture sticks to an outer surface of a firing portion of the igniter plug. This causes a greater degree of spark erosion loss left on the semiconductor. When the constituent of alumina exceeds 29% by weight, the electrical resistance value increases exceedingly, not to induce the spark discharge across the electrodes with the low voltage of 2000 V., thus rendering it difficult to serve as a low voltage type igniter plug.

The mean grain size of alumina particles should be less than 1 $\mu$m in order to reduce an amount of the spark erosion. By reducing the mean grain size of alumina to less than 0.2 $\mu$m, this tendency becomes remarkable in which the spark erosion leaves a groove-like loss behind the semiconductor with the limited and least spark erosion per a single spark discharge. The fine alumina particles become a grain boundary phase with the sintering aids selected from the group consisting of MgO, SiO$_2$, CaO, etc. The grain boundary phase surrounds the SiC particles and hold them firmly at sintering.

When the constituent of the sintering aid is short of 1% by weight, the electrical resistance value varies and tends to increase exceedingly, not to induce the spark discharge across the electrodes, thus rendering it difficult to serve as an igniter plug. When the constituent of the sintering aid exceeds 5% by weight, the semiconductor becomes fragile so that the semiconductor is spark eroded in a lump due to a spark discharge impact.

(ii) After granulating the mixture, the granulated mixture is compacted in a graphite or carbon mold die, and heated under argon gas atmosphere at the rate of 20° C./min as shown at the solid line A1 in FIG. 1. Then, the compacted body is sintered at the temperature of 1800°–1900° C. so as to form a sintering body (heating step). (iii) The sintering body is pressurized under approx. 250 kg/cm$^2$ along the phantom lines B1 of FIG. 1 after the heating temperature reaches the sintering temperature (pressurizing step). In this instance, it is to be observed that the ambient pressure is shown by the broken lines Ar1 in FIG. 1.

Since the pressure of more than 200 kg/cm$^2$ is considered sufficient to achieve the anticipated semiconductor according to the present invention, the pressure around 250 kg/cm$^2$ is best suited to the method of making the semiconductor. How much pressure is applied to the ceramic mixture body depends on the durability of the graphite or carbon mold die. The pressure exceeding 400 kg/cm$^2$ may deteriorate the life of the die, resulting in a bad production yield.

(iv) After maintaining the temperature 1800°–1900° C., while at the same time, pressurizing the sintered body under approx. 250 kg/cm$^2$ for about 30 minutes by means of a hot press procedure, the sintered body is gradually cooled down and the pressure is released when the temperature reaches approx. 1400° C. (hot pressing step).

Figure 3:
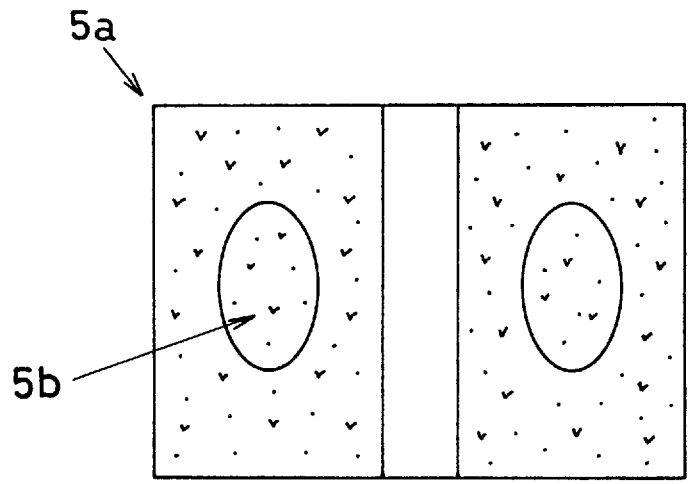
FIG. 3 is an explanatory view to show a density uniformity of an inside and outside of a semiconductor according to the invention.

(v) The sintered body 5a, thus treated, measures 10 mm in outer diameter, 2 mm in inner diameter and 6 mm in height as shown in FIG. 3. Then, the sintered body 5a is milled or polished to complete the semiconductor 5 so that it can be mounted on the igniter plug 1 (polishing step).

A comparison was done between the prior art semiconductor and the semiconductor 5 obtained according to the present invention. In FIG. 3 an encircled area 5b indicates the inward or inside of the sintered ceramic body 5a, 5 of the invention.

Figure 9:
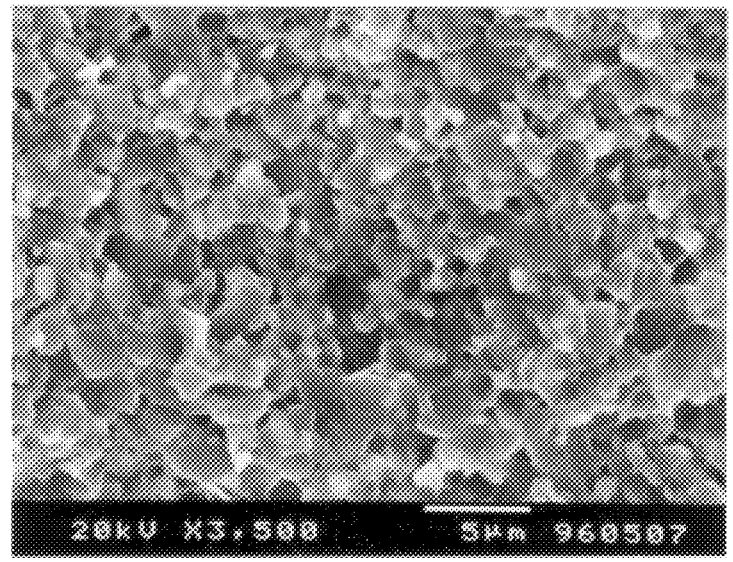
FIG. 9 is a microscopic photograph showing granular particles of an inward texture of the semiconductor according to the present invention.

During the process of making the semiconductor 5, the mixture body is pressurized when the heating temperature reaches the sintering temperature. This softens the mixture body, thus making it possible to transmit the pressure deeper inside the mixture body. This makes it possible to render the particles of the inward of the sintered semiconductor body 5 crowded thereacross as shown in FIG. 9. That is, the SiC particles of the semiconductor 5 are coagulated with grain boundary phase so as to substantially make the density distribution homogeneous or uniform as a whole. It was also found that the density of the inward of the semiconductor 5 was uniformly 3.30–3.34 g/cm$^3$ namely 98– 99 percent of theory when the constituents of silicon carbide and alumina were in turn, 75% and 25% by weight. The density of the inward of the semiconductor was measured in terms of Archimedean method.

Figure 10:
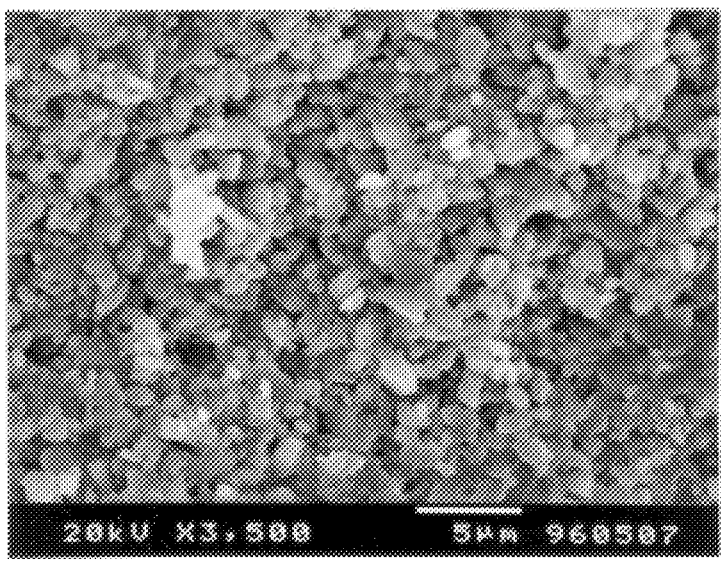
FIG. 10 is a microscopic photograph showing how granular particles of an inward texture of the semiconductor according to the prior art.

On the contrary, in the prior art, the pressure is not transmitted deeper inside the sintering body because the mixture body is started to be pressurized when it is not softened enough at the temperature far below 1800° C. This makes an inside microstructure of the semiconductor coarse as shown in FIG. 10 although it makes an outside microstructure of the semiconductor crowded. The measured density of the coarse inside is less than 95% in theory, according to the prior art.

With the homogeneous density of the semiconductor 5a from the outer surface to the inner side of the semiconductor, it is possible to make the electrical resistance generally constant across the semiconductor 5.

Figure 4:
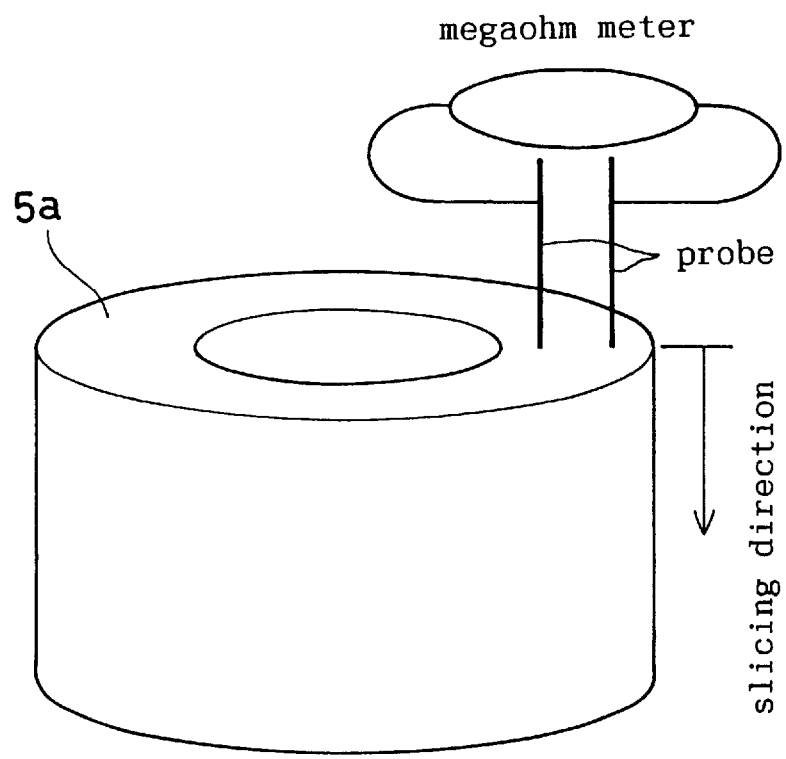
FIG. 4 is a perspective view of the semiconductor, which electrical resistance is measured on the surface.
Figure 5:
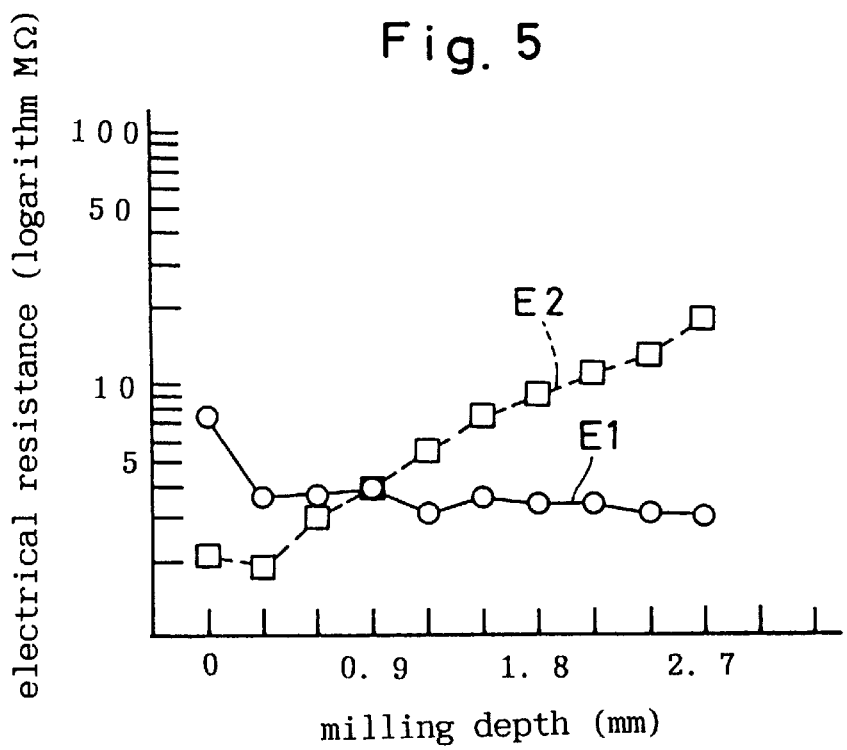
FIG. 5 is a graphical representation showing how an electrical surface resistance varies depending upon a depth measured from the outside of the semiconductor, comparing the present invention and the prior art.

In order to ascertain the above result, the electrical resistance of the semiconductor 5 is measured each time when the semiconductor is sliced by 0.3 mm from a front end surface of the semiconductor in the direction as shown by an arrow of FIG. 4. The measurement of the electrical resistance was done by using a 2000 V. megaohm meter with the probe gap taken as 1.23 mm. The results are shown at the solid line E1 of FIG. 5 which indicates that the electrical resistance of the semiconductor 5 are generally uniform from the surface to the inward portion.

In the prior art semiconductor, particularly made according to U.S. Pat. No. 4,973,877, it was found that the inside of the semiconductor significantly increased its electrical resistance as shown at the broken lines E2 of FIG. 5 since the inside texture of the semiconductor was coarse although the outer side of the semiconductor was crowded.

A durability test was carried out with the semiconductor 5 mounted on the igniter plug 1 so as to check a relationship between an erosion depth (the great erosion depth) and times of spark discharges under the conditions of 0.5 $\mu$F., 3000 V. and 10 atm. The results are shown at the solid lines F1 in FIG. 6. The solid line F1 of FIG. 6 indicates that the semiconductor 5 is superior in spark erosion resistance with the least spark erosion against a single time of spark. The erosion left a groove-like loss on the semiconductor 5 with the least and limited amount of spark erosion per a single spark discharge.

Figure 6:
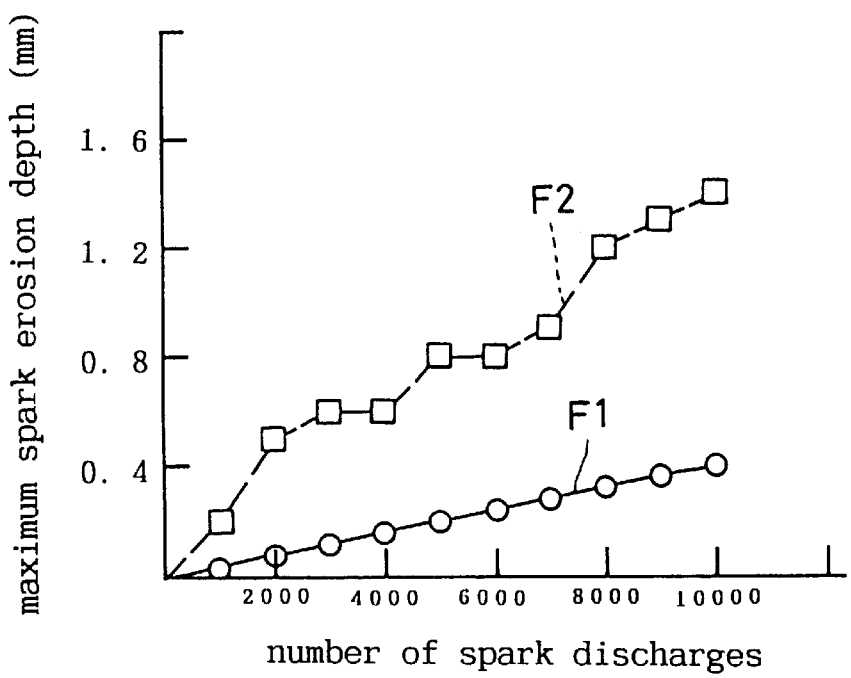
FIG. 6 is a graphical representation showing how an amount of spark erosion in the semiconductor increases depending upon times of sparks applied across the semiconductor, comparing the present invention and the prior art.
Figure 7:
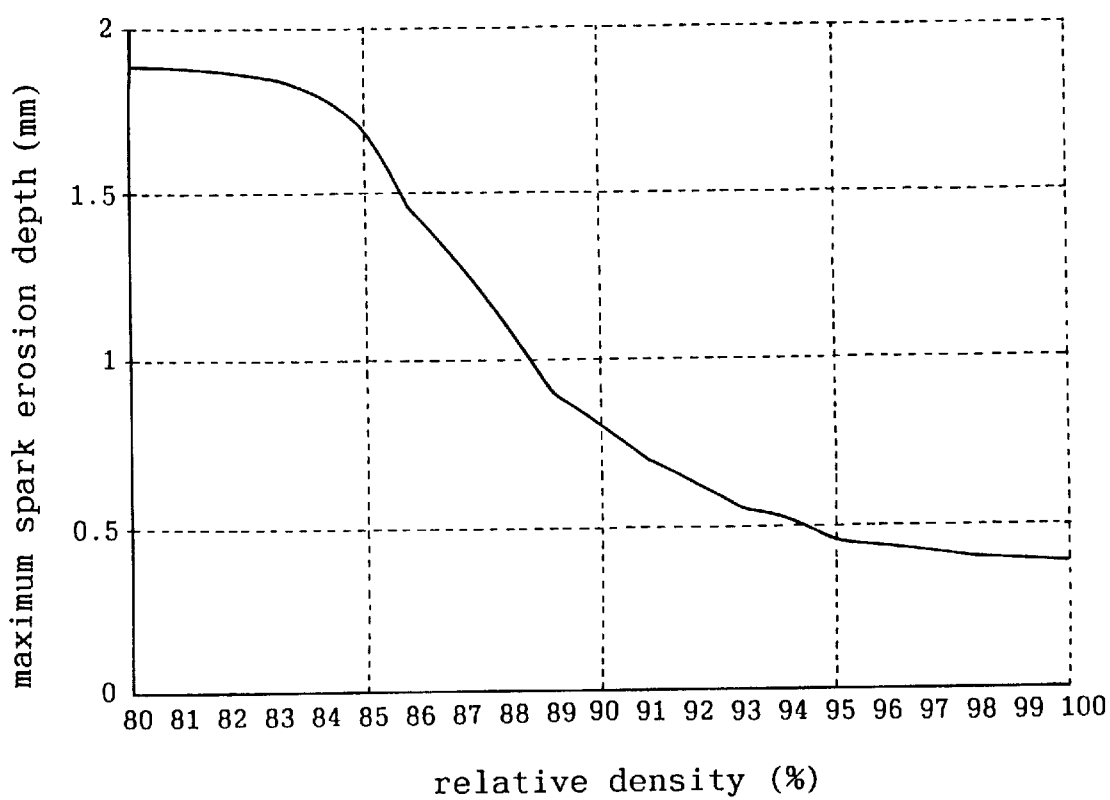
FIG. 7 is a graphical representation showing how an amount of spark erosion in the semiconductor varies depending on its relative density.
Figure 8:
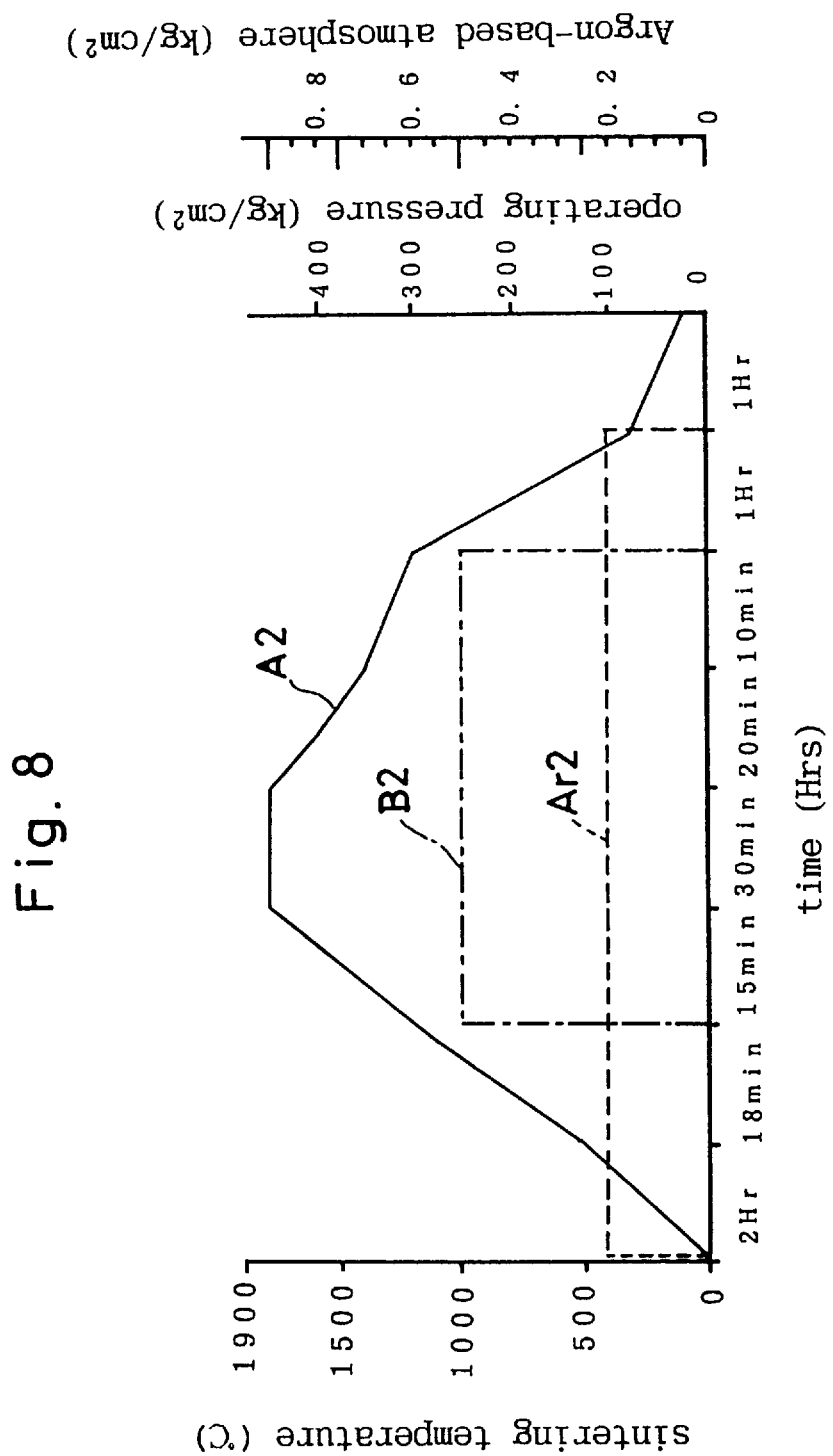
FIG. 8 is a graphical representation showing a relationship between heating temperature and pressure applied while firing a semiconducting ceramic body in a prior art.

On the contrary, it was found that the prior art semiconductor showed a greater amount of spark erosion as shown at the broken lines F2 of FIG. 6. This is because the prior art semiconductor body is only dense at the surface and coarse at the inward portion and it may not absorb a spark impact when a heavy spark discharge is repeatedly applied across the semiconductor body.

As understood from the foregoing description, it is possible to make the density and the electrical resistance of the semiconductor 5 generally constant from its outer surface to the inner side of the semiconductor, and thus significantly reducing the amount of spark erosion per a single spark discharge. With the use of the semiconductor 5 to the igniter plug 1, it is possible to extend its service life with a high reliability because of the least spark erosion generated in the semiconductor 5.

While the invention has been described with reference to the specific embodiments, it is understood that this description is not to be construed in a limiting sense in as much as various modifications and additions to the specific embodiments may be made by skilled artisans without departing from the scope of the invention.

What is claimed is:

1. In an igniter plug for jet and other internal combustion engines, which igniter plug comprises a center electrode having a firing tip, and mounted within an insulator which in turn is mounted within an exterior metal shell, a ground electrode integral or in electrical contact relationship with the metal shell and in spaced, spark gap relation with the firing tip of the center electrode, and an electrically semi-conducting surface adjacent the spark gap and in electrical contact with the center electrode and with the ground electrode, the improvement wherein said electrically semi-conducting surface is a sintered ceramic body having an actual density of more than 95 percent of its theoretical maximum density, and consisting essentially of 67–80 percent by weight of silicon carbide particles and 20–33 percent by weight of grain boundary phase of alumina particles, and selected from sintering aids selected from the group consisting of magnesia, silica, and calcia.

2. The igniter plug as recited in claim 1, wherein said sintered ceramic body has a substantially uniform density from an outer surface of said sintered ceramic body to an inner surface of said sintered ceramic body.

3. The igniter plug as recited in claim 1, wherein particles of the sintered ceramic body are each coagulated with its grain boundary phase.

4. The igniter plug as recited in claim 1, wherein said sintered ceramic body has a substantially uniform electric electrical resistance level from the depth of 0.3 mm toward the inner ceramic body.

5. The igniter plug as recited in any one of claims 1 through 4, wherein said sintered ceramic body has a density of 3.30–3.34 g/cm$^3$.

6. The igniter plug as recited in claim 5, wherein said sintered ceramic body is a tube or ring having a height of 4 mm to 10 mm.

7. The igniter plug as recited in claim 5, wherein said sintered ceramic body contains about 75% by weight of silicon carbide.

8. A method of making a semiconductor for an igniter plug by means of a hot press procedure, comprising steps of:

(a) mixing 67–80 percent by weight of silicon carbide particles and 19–29 percent by weight of alumina particles and 1–5 percent by weight of one or more sintering aids selected from the group consisting of magnesia, silica, and calcia, so as to provide a ceramic mixture;

(b) granulating said ceramic mixture to have generally uniform grains so as to provide an unfired ceramic body;

(c) heating said unfired ceramic body at a sintering temperature of 1800°–1900° C. to thermally sinter it; and (d) applying pressure to said ceramic body at a pressure of 200 kg/cm$^2$ or more upon the heating temperature reaching the sintering temperature during said step (c).

9. The method of making a semiconductor for an igniter as recited in claim 8, wherein said silicon carbide particles have a mean particle size of no more than 0.5 μm, and said alumina particles having a mean particle size of no more than 0.2 μm.

* * * * *